(12) United States Patent
Darshan (10) Patent No.: US 9,563,243 B2
(45) Date of Patent: Feb. 7, 2017

(54) POWER OVER ETHERNET MIDSPAN INJECTION METHOD AND APPARATUS

(71) Applicant: Microsemi Corp.—Analog Mixed Signal Group, Ltd., Hod Hasharon (IL)

(72) Inventor: Yair Darshan, Petach Tikva (IL)

(73) Assignee: Microsemi P.O.E. Ltd., Hod Hasharon (IL)

( * ) Notice: Subject to any disclaimer, the term of this patent is extended or adjusted under 35 U.S.C. 154(b) by 81 days.

(21) Appl. No.: 14/730,297

(22) Filed: Jun. 4, 2015

(65) Prior Publication Data

US 2015/0362966 A1    Dec. 17, 2015

Related U.S. Application Data

(60) Provisional application No. 62/010,468, filed on Jun. 11, 2014.

(51) Int. Cl.
*G06F 1/26* (2006.01)
*H04L 12/10* (2006.01)

(52) U.S. Cl.
CPC ............... *G06F 1/26* (2013.01); *H04L 12/10* (2013.01)

(58) Field of Classification Search
CPC ............ G06F 1/26; G06F 1/266; H04L 12/10
USPC .......................................................... 713/300
See application file for complete search history.

(56) References Cited

U.S. PATENT DOCUMENTS

| | | | | |
|---|---|---|---|---|
| 7,145,439 | B2* | 12/2006 | Darshan | G06F 1/3209 340/12.32 |
| 7,940,787 | B2* | 5/2011 | Karam | H04L 12/10 370/419 |
| 8,132,027 | B2 | 3/2012 | Blaha et al. | |
| 2007/0278857 | A1* | 12/2007 | Robbins | H02J 1/10 307/2 |
| 2007/0288771 | A1* | 12/2007 | Robbins | H04L 12/10 713/300 |
| 2009/0063874 | A1* | 3/2009 | Diab | G06F 1/266 713/300 |
| 2012/0242168 | A1* | 9/2012 | Tsai | H04L 12/10 307/112 |

* cited by examiner

*Primary Examiner* — Chun Cao
(74) *Attorney, Agent, or Firm* — Simon Kahn (57) ABSTRACT

A PoE midspan injector constituted of: an Ethernet device side data port; a PD side data port; a plurality of pairs of data wires coupling the Ethernet device and PD side data ports; a power reception port; a pair of first type coils; and a pair of second type coils, each second type coil coupled in series to a respective first type coil thereby forming a coil set, wherein the power reception port is coupled to each wire of a pair of data wire pairs at a respective power node, via a respective coil set, wherein the impedance of the first type coil is greater than the impedance of the second type coil when data is being transmitted at a minimum frequency, and wherein the impedance of the second type coil is greater than the impedance of the first type coil when data is being transmitted at a maximum frequency.

26 Claims, 5 Drawing Sheets

FIG. 1

PRIOR ART

POWER OVER ETHERNET MIDSPAN INJECTION METHOD AND APPARATUS

TECHNICAL FIELD

The invention relates generally to the field of power over Ethernet, and in particular a power over Ethernet Midspan injector suitable for high data rates.

BACKGROUND

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). There are two methods of injecting power over Ethernet: Endspan; and Midspan. In Endspan injection, the PSE is provided at an Ethernet hub, or switch. The PSE provides power over the data wires connecting the Ethernet switch and the PD. In Midspan injection, the power is provided through a midspan injector arranged to inject the PSE supplied power into the data wires between the Ethernet hub or switch and the PD.

Figure 1:
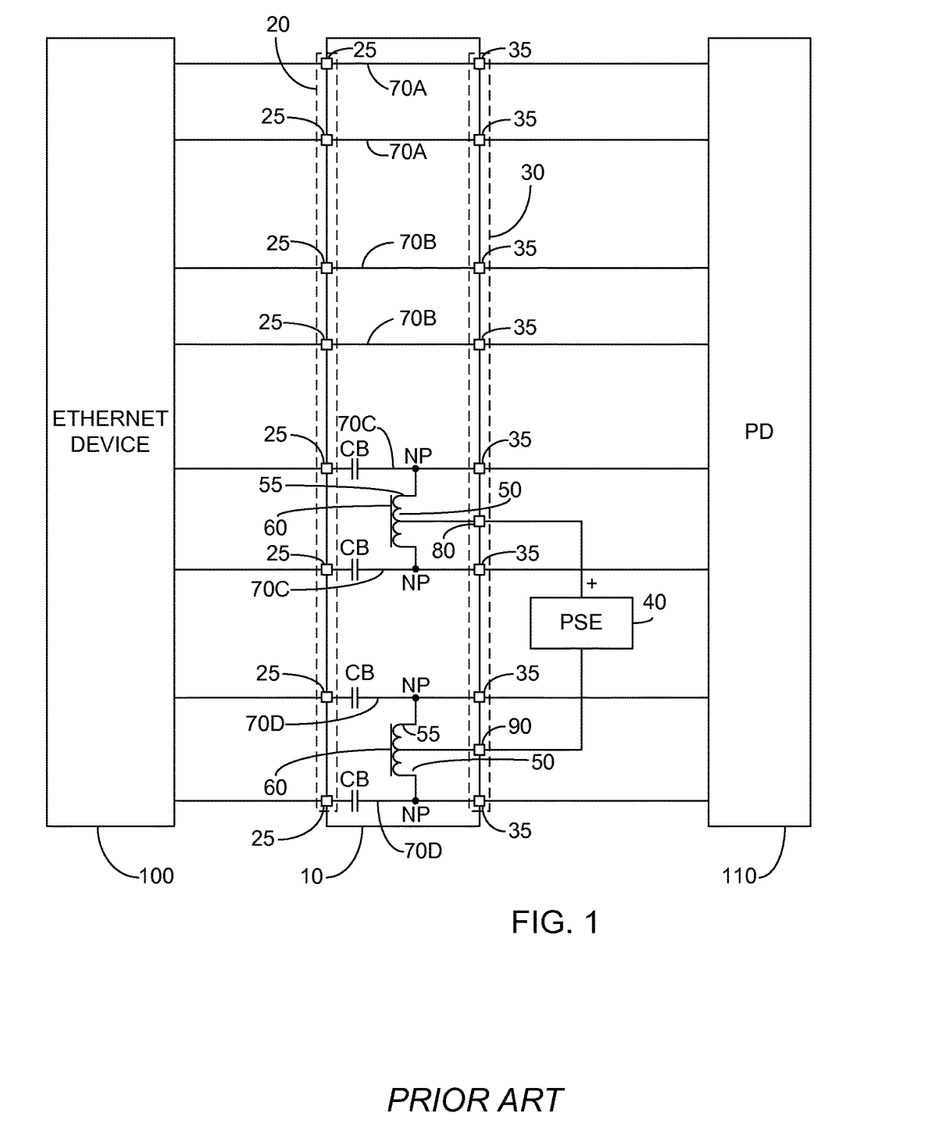
FIG. 1 illustrates a high level schematic diagram of a PoE midspan injector coupled between an Ethernet device and a powered device, according to the prior art.

FIG. 1 illustrates a high level schematic diagram of a prior art PoE midspan injector 10, comprising: an Ethernet device side data port 20 comprising a plurality of pins 25; a powered device side data port 30 comprising a plurality of pins 35; a pair of auto-transformers 50, each comprising a coil 55 wound around a magnetic core 60; a plurality of DC blocking capacitors, denoted CB; a plurality of pairs of data wires 70, denoted 70A, 70B, 70C and 70D, respectively; a power reception port 80; and a power return port 90. In one non-limiting embodiment, magnetic core 60 of each auto-transformer 50 comprises ferrite.

PoE midspan injector 10 is in communication with an Ethernet device 100, such as an Ethernet hub or Ethernet switch, via Ethernet device side data port 20. PoE midspan injector 10 is further in communication with a PD 110 via powered device side data port 30. Each pair of pins 35 is coupled to a respective pair of pins 25 via a respective one of data wire pairs 70A, 70B, 70C and 70D. Power reception port 80 is coupled to a power output of a power sourcing equipment (PSE) 40 and power return port 90 is coupled to a return of PSE 40. PSE 40 is illustrated as being external of PoE midspan injector 10, however this is not meant to be limiting in any way and in another embodiment (not shown) PSE 40 is provided within PoE midspan injector 10.

Power reception port 80 is coupled to a center tap of a first auto-transformer 50 and the first and second ends of first auto-transformer 50 are each connected to a power node NP of a respective wire of data wire pair 70C, with power node NP for each wire of the respective wire pair defined as an electrical connection point between pin 25 and pin 35. Power return port 90 is coupled to a center tap of a second auto-transformer 50 and the first and second ends of second auto-transformer 50 are each connected to a power node NP of a respective wire of data wire pair 70D.

Each of data wires 70C and 70D is arranged to couple the respective pin 25 to the respective pin 35 via a respective DC blocking capacitor CB, DC blocking capacitor CB coupled between power node NP and pin 25.

In operation, PSE 40 is arranged to provide direct current (DC) power to PD 110 via first and second auto-transformers 50 and the respective data wires 70C and 70D. In particular, PSE 40 provides power to power nodes NP of data wires 70C, the return of PSE 40 being through power nodes NP of data wires 70D. Blocking capacitors CB are arranged to block the output DC power of PSE 40 from reaching Ethernet device 100, while allowing data signals to pass therethrough. PoE midspan injector 10 is illustrated as providing power from a single PSE 40 over data wire pairs 70C and 70D, however this is not meant to be limiting in any way. In another embodiment (not shown), PoE midspan injector 10 is arranged to provide power from two PSE 40s over all four of data wire pairs 70A, 70B, 70C and 70D.

The impedance of an electric coil is a function of its inductance and parasitic capacitance between windings and between the windings to the core.

The impedance of the inductor only, i.e. without the parasitic capacitance thereof, is given as:

$$X_L = 2*\pi*f*L \qquad \text{EQ. 1}$$

where f is the signal frequency and L is the inductance of the coil. The inductance of the coil, constructed for example as a Toroid, is given as:

$$L = (\mu_0 * \mu_r * N^2 * A)/l \qquad \text{EQ. 2}$$

where $\mu_0$ is the magnetic permeability of air, $\mu_r$ is the relative magnetic permeability of the coil core material, N is the number of coil windings, A is the area of the cross-section of the coil and l is the length of the coil in its winded state. The impedance of the parasitic capacitance (inter winding capacitance and stray capacitance) is given by:

$$X_C = 1/(2*\pi*f*C) \qquad \text{EQ. 3}$$

where C is the parasitic capacitance and f is the signal frequency. The capacitance is increased if the number of coil windings is increased. In general, the total impedance of the wound coil is $X_L$ in parallel to $X_C$. Although the total impedance is more complex and may contain several combinations of inductance and capacitance, a simple construction of inductance and capacitance in parallel will be addressed for simplicity.

As shown in EQ. 1, the impedance of coil 55 decreases when the data signal frequency decreases. In order to prevent excess loading of data signals on data pairs 70C and 70D due to coil 55, the impedance thereof must be sufficient over the range of data frequencies. At low frequencies, a large inductance L is necessary to so as to avoid having a low impedance load across the respective data wires 70C and 70D. As shown in EQ. 2, increasing the inductance of coil 55 may be accomplished by increasing the number of windings and/or increasing the cross-section area thereof, however this increases the size of auto-transformer 50 which is undesirable. Magnetic core 60 is therefore provided to increase the magnetic permeability μ, and as a result increase the inductance, and therefore the impedance, of auto-transformer 50 without having to increase the number of windings and cross-section area thereof. Typically, coil 55 and magnetic core 60 are selected such that auto-transformer 50 exhibits an inductance of 160-600 μH, preferably greater than 500 μH, the inductance measured at a data frequency of about 100 kHz. The inductance of each of Ethernet device 100 and PD 110, which are in parallel to the inductance of auto-transformer 50, is typically about 160 μH, therefore an inductance of greater than 500 μH is preferred for auto-transformer 50 so that the inductance of auto-transformer 50 does not significantly impact the inductance of Ethernet device 100 thereby disrupting the data transmission over data wire pairs 70C and 70D.

10-gigabit (10G) Ethernet, also known as 10GBase-T, in accordance with IEEE 802.3-2012, published by the Institute of Electrical and Electronics Engineers, Inc., New York, the entire contents of which is incorporated herein by reference, defines Ethernet frame transmission at 10 gigabits per second. For 10G Ethernet, each data wire pair 70A, 70B, 70C and 70D should be able to transmit data at frequencies of up to 500 MHz, preferably up to 600 MHz, such that 2.5 gigabits of information are encoded and compressed into the 500 MHz signal. Unfortunately, at such frequencies the magnetic permeability $\mu_r$ of magnetic core 60 rolls off, thereby reducing the inductance of auto-transformer 50, as seen from EQ. 2. As a result, as seen from EQ. 1, the impedance of auto-transformer 50 decreases. Additionally, at high frequencies the parasitic capacitance between the windings of coil 55 further reduces the impedance of auto-transformer 50. Therefore, at 10G Ethernet data frequencies auto-transformers 50 will provide a low impedance load to the respective data lines thereby creating significant insertion and return losses in the transmitted data.

There is thus a long felt need for a POE Midspan injection method and apparatus which allows for 10G Ethernet data transmission.

SUMMARY OF THE INVENTION

Accordingly, it is a principal object of the present invention to overcome the disadvantages of prior art PoE midspan injectors. This is provided in one embodiment by a power over Ethernet midspan injector for providing power to a powered device, the power over Ethernet midspan injector comprising: an Ethernet device side data port comprising a plurality of pairs of pins; a powered device side data port comprising a plurality of pairs of pins; a plurality of pairs of data wires arranged to transmit data at frequencies of between a predetermined minimum frequency up to a predetermined maximum frequency, each of the plurality of pairs of pins of the powered device side data port coupled via a respective one of the plurality of data wire pairs to a respective one of the plurality of pairs of pins of the Ethernet device side data port; a power reception port; a pair of first type coils; and a pair of second type coils, each of the pair of second type coils coupled in series to a respective one of the pair of first type coils thereby forming a coil set, wherein the power reception port is coupled to each wire of a pair of the plurality of data wire pairs at a respective power node, via a respective coil set, wherein the impedance of the first type coil is greater than the impedance of the second type coil when data is being transmitted through the first data wire pair at the predetermined minimum frequency, and wherein the impedance of the second type coil is greater than the impedance of the first type coil when data is being transmitted through the first data wire pair at the predetermined maximum frequency.

In one embodiment, the impedance of each of the first coil sets is at least 2 times greater than the differential impedance of the first data wire pair when data is being transmitted through the first data wire pair at any data frequency between the predetermined minimum frequency and the predetermined maximum frequency.

In another embodiment, each of the first pair of first type coils is wound around a first type core and each of the first pair of second type coils is wound around a second type core, the second type core is different than the first type core. In one further embodiment, the first type core is a magnetic core and the second type core is an air core.

In one embodiment, the number of windings of each of the first pair of first type coils is greater than the number of windings of each of the first pair of the second type coils. In one further embodiment, the number of windings of each of the first pair of first type coils is at least 5 times greater than the number of windings of each of the first pair of the second type coils.

In another embodiment, the pair of first type coils share a common core thereby forming an auto-transformer, the power reception port coupled to a center tap of the auto-transformer.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term resistor as used herein refers to an element defined in an integrated circuit arranged to present resistance to a current flow there through.

Figure 2A:
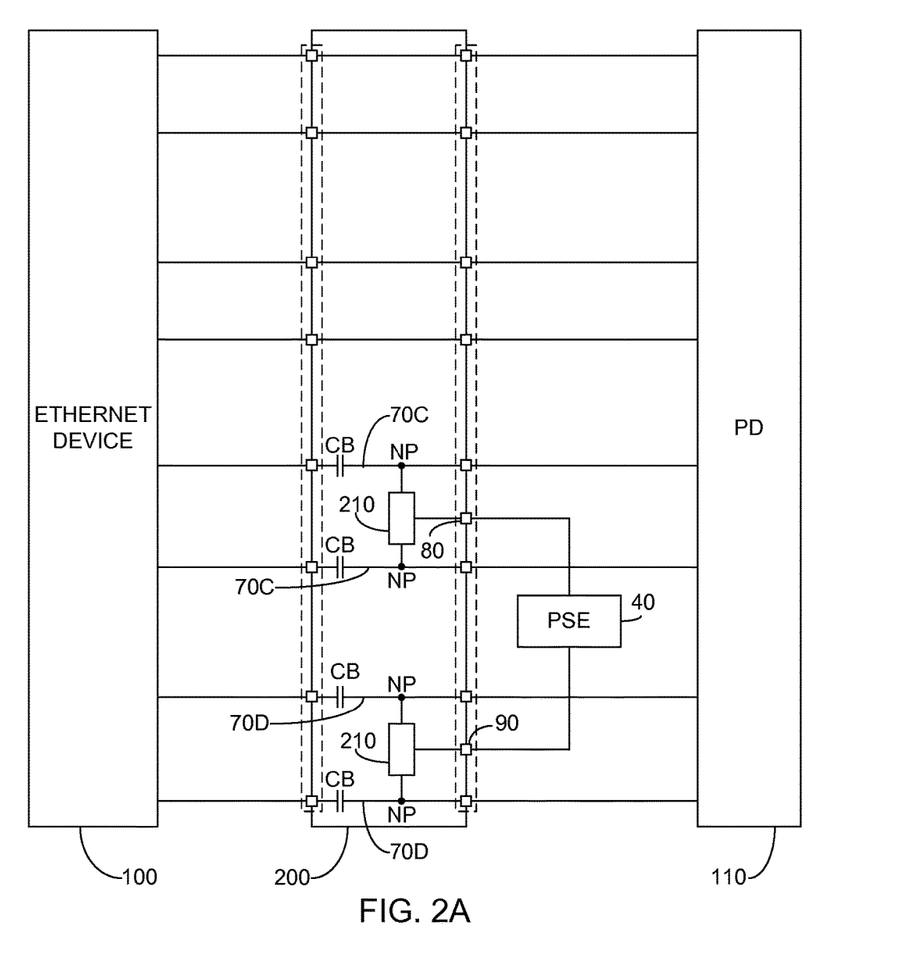
FIG. 2A illustrates a high level schematic diagram of a PoE midspan injector coupled between an Ethernet device and a powered device, according to certain embodiments.
Figure 2B:
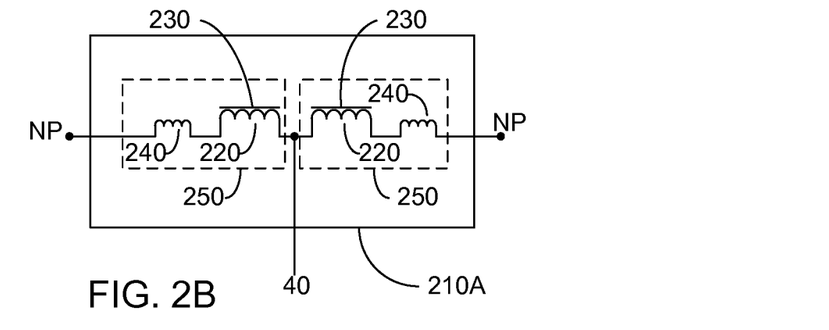
FIG. 2B illustrates a high level schematic diagram of a first embodiment of a power injector of FIG. 2A utilizing a pair of first core type coils and a pair of second core type coils.
Figure 2C:
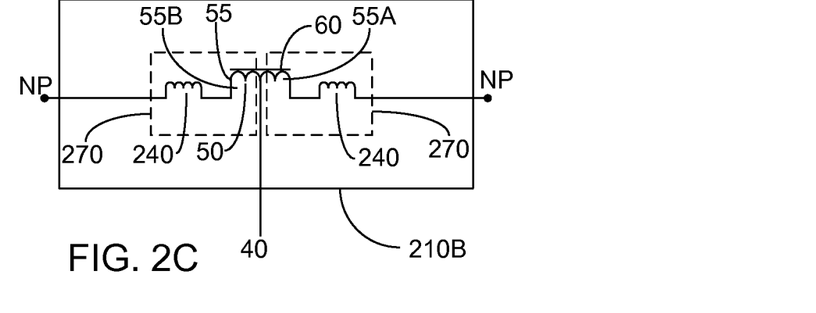
FIG. 2C illustrates a high level schematic diagram of a second embodiment of a power injector of FIG. 2A wherein the pair of first core type coils are wound about a signal common core.
Figure 2D:
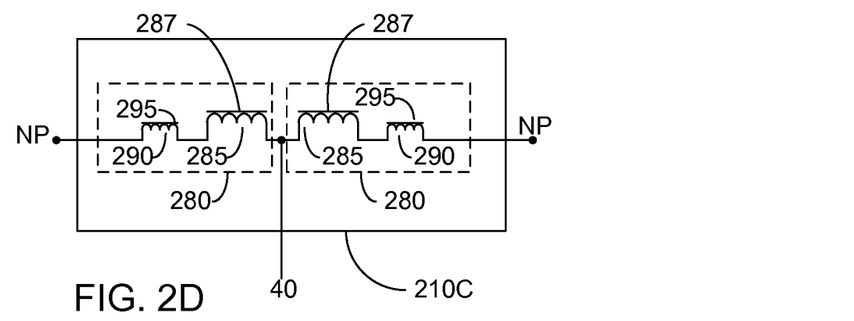
FIG. 2D illustrates a high level schematic diagram of a third embodiment of a power injector of FIG. 2A utilizing a pair of first type coils exhibiting a first number of windings and a pair of second type coils exhibiting a second number of windings.

FIG. 2A illustrate a high level schematic diagram of a PoE midspan injector 200 in communication with an Ethernet device 100 and a PD 110, according to certain embodiments. PoE midspan injector 200 is in all respects similar to PoE midspan injector 10 of FIG. 1 with the exception that auto-transformers 50 are replaced with a pair of power injectors 210. FIG. 2B illustrates a first embodiment of power injector 210, denoted 210A, FIG. 2C illustrates a second embodiment of power injector 210, denoted 210B, and FIG. 2D illustrates a third embodiment of power injector 210, denoted 210C. For simplicity and ease of understanding FIGS. 2A-2D will be described together.

Power injector 210A of FIG. 2B comprises: a pair of first core type coils 220, each wound around a respective magnetic core 230; and a pair of second core type coils 240, each wound around a respective air core. In one embodiment, pair of second core type coils 240 are wound around the same air core. In one further embodiment, pair of second core type coils 240 are twisted together and wound around the same air core. As described above in relation to magnetic core 60, in one embodiment each magnetic core 230 comprises ferrite. The term 'air core' as used herein is not limited to air and specifically includes any type of core which does not exhibit substantial magnetic permeability such as cores comprising ceramics, plastics or glass, as known to one skilled in the art at the time of invention. Additionally, an air core winded inductor exhibits low parasitic capacitance between windings and between windings and the core, thereby maintaining the desired impedance at a high frequency operating range, as will be described below.

As described above in relation to auto-transformer 50 of FIG. 1, in one embodiment each first core type coil 220 of power injector 210A wound around the respective magnetic core 230 is arranged to exhibit an inductance of at least 250 µH, optionally greater than 300 µH and each second core type coil 240 is arranged to exhibit an inductance 0.33 µH-1 µH, so that a serial combination of the pair of first core type coils 220 and the pair of second core type coils 240 is arranged to exhibit an inductance of at least 500-600 µH, optionally greater than 600 µH. The inductances described above are all measured at a frequency of 100 kHz to minimize high frequency effects on measurement accuracy and to ensure the desired high inductance for allowing operation at lower data rates than 10GBase-T, such as 100Base-T, i.e. 100 Mbit/s. Other combinations of inductance values for 220 and 240 or for 50 and 240, coil and core details can be used in order to achieve the target minimum impedance values over the operating frequency range. PSE 40 is coupled to a first end of both first core type coils 220, and a second end of each first core type coil 220 is connected to a respective power node NP via a respective second core type coil 240.

As described above in relation to FIG. 1, a first power injector 210A is arranged to couple the power output of PSE 40 to data wire pair 70C and a second power injector 210A is arranged to couple data wire pair 70D to the return of PSE 40. For first power injector 210A, a first end of each first core type coil 220 is coupled to the power output of PSE 40 via power reception port 80 and a second end of each first core type coil 220 is coupled to the respective power nodes NP of data wire pair 70C via respective second core type coils 240. For second power injector 210A, a first end of each first core type coil 220 is coupled to the return of PSE 40 via power return port 90 and a second end of each first core type coil 220 is coupled to the respective power nodes NP of data wire pair 70D via a respective second core type coil 240. Thus, each data wire 70C and 70D is coupled to PSE 40 through a respective coil set 250 comprising a first core type coil 220 and a second core type coil 240 serially coupled together.

In operation, the DC power of PSE 40 is transferred through first core type coils 220 and second core type coils 240 of the respective coil sets 250 to power nodes NP of data wires 70C, the return being from power nodes NP of data wires 70D through first core type coil 240 and second core type coil 220 of the respective coil sets 250. As described above, DC blocking capacitors CB are arranged to block the DC power of PSE 40 from reaching Ethernet device 100. When data wires 70C and 70D are transmitting data at low frequencies, first core type coils 220 provide a high impedance to the data signals and don't cause significant losses in the data signal. Second core type coils 240, which due to the low inductance thereof exhibit a significantly lower impedance than first core type coils 220, are coupled in series with first core type coils 220 and therefore do not impact the data signal.

When data wires 70C and 70D are transmitting data at high frequencies of up to 500 MHz, first core type coils 220 present a very low impedance to data wires 70C and 70D due to the roll off of the magnetic permeability of the respective magnetic cores 230, thereby causing significant insertion and return losses in the transmitted data, as described above in relation to FIG. 1. The air cores of second core type coils 240 are not significantly affected by the data frequency since they have no substantial magnetic permeability and relatively small parasitic capacitance. Although the inductance of each second core type coil 240 is very small, optionally about 0.33 µH, the high frequency significantly increases the impedance thereof, as seen from EQ. 1 described above. Thus, the increased impedance of second core type coils 240 compensate for the reduced impedance of first core type coils 220 and present a significantly large impedance to data wires 70C and 70D such that the insertion and return losses in the data signals are within 10G Ethernet specification requirements. Advantageously, second core type coils 240 take up little space since they exhibit a relatively small inductance. In one embodiment, first core type coils 220 and second core type coils 240 are arranged such that the combined impedance thereof is at least 2 times greater than the differential impedance of each of data wire pairs 70C and 70D for all data transmission frequencies, i.e. up to 500 MHz for 10GBaseT applications, optionally between 2-10 times greater across the data transmission spectrum such that at lower frequencies the combined impedance of first core type coils 220 and second core type coils 240 is at least 10 times greater than the differential impedance of each of data wire pairs 70C and 70D and a high frequencies the combined impedance is at least 2 times greater than the data wire pair differential impedance. Optionally, at the maximum data frequency the combined impedance of first core type coils 220 and second core type coils 240 is at least 200Ω.

Further advantageously, due to the air core, the parasitic capacitances of second core type coils 240 are significantly smaller than the parasitic capacitances of first core type coils 220. As a result, at high frequencies where the parasitic capacitances generate small impedances across first core type coils 220 the impedance of the parasitic capacitances of second core type coils 240 remains high thereby not significantly impacting the insertion and return losses of the transmitted data.

In the embodiment where second core type coils 240 are wound around the same air core, and optionally twisted together, the lengths of each second core type coil are the same. As described above in relation to EQ. 2, the inductance of a coil, an as a result the impedance thereof, is a function of the length of the coil. Therefore, the impedances of the pair of second core type coils 240 are better matched.

The above has been described in an embodiment where PSE 40 is coupled to the respective coils 220, each first core type coil 220 being coupled to the respective one of data lines 70C and 70D via a respective second core type coil 240, however this is not meant to be limiting in any way. In another embodiment (not shown), PSE 40 is coupled to pairs of second core type coils 240, each second core type coil 240 being coupled to the respective one of data lines 70C and 70D via a respective first core type coil 220. The operation of PoE midspan injector 200 is identical for both embodiments.

Power injector 210B of FIG. 2C comprises: an auto-transformer 50 comprising a first core type coil 55 wound around a magnetic core 60, as described above in relation to FIG. 1; and a pair of second core type coils 240, each wound around a respective air core. As described above in relation to FIG. 1, a first power injector 210B is arranged to couple the power output of PSE 40 to data wire pair 70C and a second power injector 210B is arranged to couple data wire pair 70D to the return of PSE 40. For first power injector 210B, a center tap of the respective auto-transformer 50 is coupled to the power output port of PSE 40 via power reception port 80 and a first and second end of auto-transformer 50 are each coupled to the respective power node NP of data wire pair 70c via a respective second core type coil 240. For second power injector 210B, a center tap of the respective auto-transformer 50 is coupled to the return of PSE 40 via power return port 90 and a first and second end of auto-transformer 50 are each coupled to the respective power node NP of data wire pair 70C via a respective second core type coil 240. Thus, each data wire 70C and 70D is coupled to PSE 40 through a coil set 260 comprising a respective half of first core type coil 55, denoted respectively as first core type coil 55A and first core type coil 55B, and a respective second core type coil 240 serially coupled together.

The operation of power injector 210B is in all respects similar to the operation of power injector 210A, with the exception that the single core of auto-transformer 50 does not generate a substantial DC magnetic field. In particular, in power injector 210A the DC current flowing through each first core type coil 220 generates a magnetic field within the respective magnetic core 230. If the magnetic field increases too much, magnetic core 230 will saturate thereby causing the magnetic permeability to drop. As a result, the impedance of first core type coil 220 will decrease, as described above in relation to EQ. 1. In order to avoid saturation, a large magnetic core 230 is necessary. In contrast, the DC current from PSE 40 flows through each half of first core type coil 55, first half 55A and second half 55B, the halves of first core type coil 55 defined by the center tap thereof, in opposing directions. Thus, the magnetic field generated responsive to the current flowing through the first half 55A of first core type coil 55 cancels the magnetic field generated responsive to the current flowing through the second half 55B of first core type coil 55. A smaller magnetic core 60, than required in the embodiment of FIG. 2B, is thus sufficient. As described above in relation to coil sets 250 of FIG. 2B, PSE 40 is coupled to data wire pairs 70C and 70D through respective coil sets 260, each comprising a second core type coil 240 and a respective half of an auto-transformer 50 comprising a single first core type coil 55.

In one embodiment (not shown), DC blocking capacitors CB are not provided. In such an embodiment, DC blocking capacitors are provided within Ethernet device 100 to prevent the flow of DC power from PSE 40.

Power injector 210C of FIG. 2D comprises: a pair of first type coils 285, each wound around a respective magnetic core 287; and a pair of second type coils 290, each wound around a respective magnetic core 295. Each of first type coils 285 exhibit a first number of windings around the respective magnetic core 287 and each of second type coils 290 exhibit a second number of windings around the respective magnetic core 295, the first number of windings greater than the second number of windings. In one non-limiting embodiment, the number of windings of each first type coil 285 is at least 5 times the number of windings of each second type coil 290. In one further non-limiting embodiment, the number of windings of each first type coil 285 is at least 10 times the number of windings of each second type coil 290. The above winding ratios are not meant to be limiting and any ratio between the number of windings of first type coils 285 and the number of windings of second type coils 290 may be selected to meet the required minimum impedance, without exceeding the scope. In one embodiment (not shown), as described above in relation to power injector 210B of FIG. 2C, first type coils 285 form an auto-transformer. In another embodiment, pair of second type coils 290 are wound around a single magnetic core 195, and optionally twisted together, as described above in relation to second core type coils 240 of FIG. 2B. As described above in relation to magnetic core 60, in one embodiment each magnetic core 287 and 295 comprises ferrite.

As described above in relation to auto-transformer 50 of FIG. 1, in one embodiment each first type coil 285 of power injector 210C wound around the respective magnetic core 287 is arranged to exhibit an inductance of at least 250 µH, optionally greater than 300 µH and each second type coil 290 wound around the respective magnetic core 295 is arranged to exhibit an inductance 0.33 µH-1 µH, so that a serial combination of the pair of first type coils 285 and the pair of second type coils 290 is arranged to exhibit an inductance of at least 500-600 µH, optionally greater than 600 µH. As described above, the inductances described above are all measured at a frequency of 100 kHz to minimize high frequency effects on measurement accuracy and to ensure the desired high inductance for allowing operation at lower data rates than 10GBase-T, such as 100Base-T, i.e. 100 Mbit/s. Other combinations of inductance values for coils 285 and 290, coil and core details can be used in order to achieve the target minimum impedance values over the operating frequency range. PSE 40 is coupled to a first end of both first type coils 285, and a second end of each first type coil 285 is connected to a respective power node NP via a respective second type coil 290.

As described above in relation to FIG. 1, a first power injector 210C is arranged to couple the power output of PSE 40 to data wire pair 70C and a second power injector 210C is arranged to couple data wire pair 70D to the return of PSE 40. For first power injector 210C, a first end of each first type coil 285 is coupled to the power output of PSE 40 via power reception port 80 and a second end of each first type coil 285 is coupled to the respective power nodes NP of data wire pair 70C via respective second type coils 290. For second power injector 210C, a first end of each first type coil 285 is coupled to the return of PSE 40 via power return port 90 and a second end of each first type coil 285 is coupled to the respective power nodes NP of data wire pair 70D via a respective second type coil 290. Thus, each data wire 70C and 70D is coupled to PSE 40 through a respective coil set 280 comprising a first type coil 285 and a second type coil 290 serially coupled together.

The operation of power injector 210C is in all respects similar to the operation of power injector 210A. When data wires 70C and 70D are transmitting data at low frequencies, first type coils 285 provide a high impedance to the data signals and don't cause significant losses in the data signal, due to the increased number of windings. In particular, as described above in relation to EQ. 2, the inductance of a coil increases with an increased amount of windings, thereby increasing the impedance thereof, as described above in relation to EQ. 1. Second core type coils 290, which due to the lower number of windings exhibit a lower inductance, and thus a lower impedance than first type coils 290, are coupled in series with first type coils 285 and therefore do not impact the data signal.

When data wires 70C and 70D are transmitting data at high frequencies of up to 500 MHz, first type coils 285 present a low impedance to data wires 70C and 70D due to: the roll off of the magnetic permeability of the respective magnetic cores 287, as described above; and the parasitic capacitance, which causes the impedance to decrease as the data frequency increases, as described above in relation to EQ. 3. The low impedance causes significant insertion and return losses in the transmitted data, as described above. Second type coils 290 exhibit a reduced parasitic capacitance in relation to first type coils 285, due to the reduced number of windings. Therefore, although the impedance associated with the inductance of second type coils 290, i.e. $X_L$ described in EQ. 1, will be reduced due to the roll off of the magnetic permeability of the respective magnetic cores 295, the impedance associated with the parasitic capacitance, i.e. $X_C$ described in EQ. 3, will decrease at a lesser rate than in first type coils 285 due to the reduced parasitic capacitance.

Thus, as described above in relation to FIG. 2B, the increased impedance of second type coils 290 compensate for the reduced impedance of first type coils 285 and present a significantly large impedance to data wires 70C and 70D such that the insertion and return losses in the data signals are within 10G Ethernet specification requirements. Advantageously, second type coils 290 take up little space since they exhibit a small number of windings. In one embodiment, first type coils 285 and second type coils 290 are arranged such that the combined impedance thereof is at least 2 times greater than the differential impedance of each of data wire pairs 70C and 70D for all data transmission frequencies, i.e. up to 500 MHz for 10GBaseT applications, optionally between 2-10 times greater across the data transmission spectrum such that at lower frequencies the combined impedance of first type coils 285 and second type coils 290 is at least 10 times greater than the differential impedance of each of data wire pairs 70C and 70D and a high frequencies the combined impedance is at least 2 times greater than the data wire pair differential impedance. Optionally, at the maximum data frequency the combined impedance of first type coils 285 and second type coils 290 is at least 200Ω.

Figure 3:
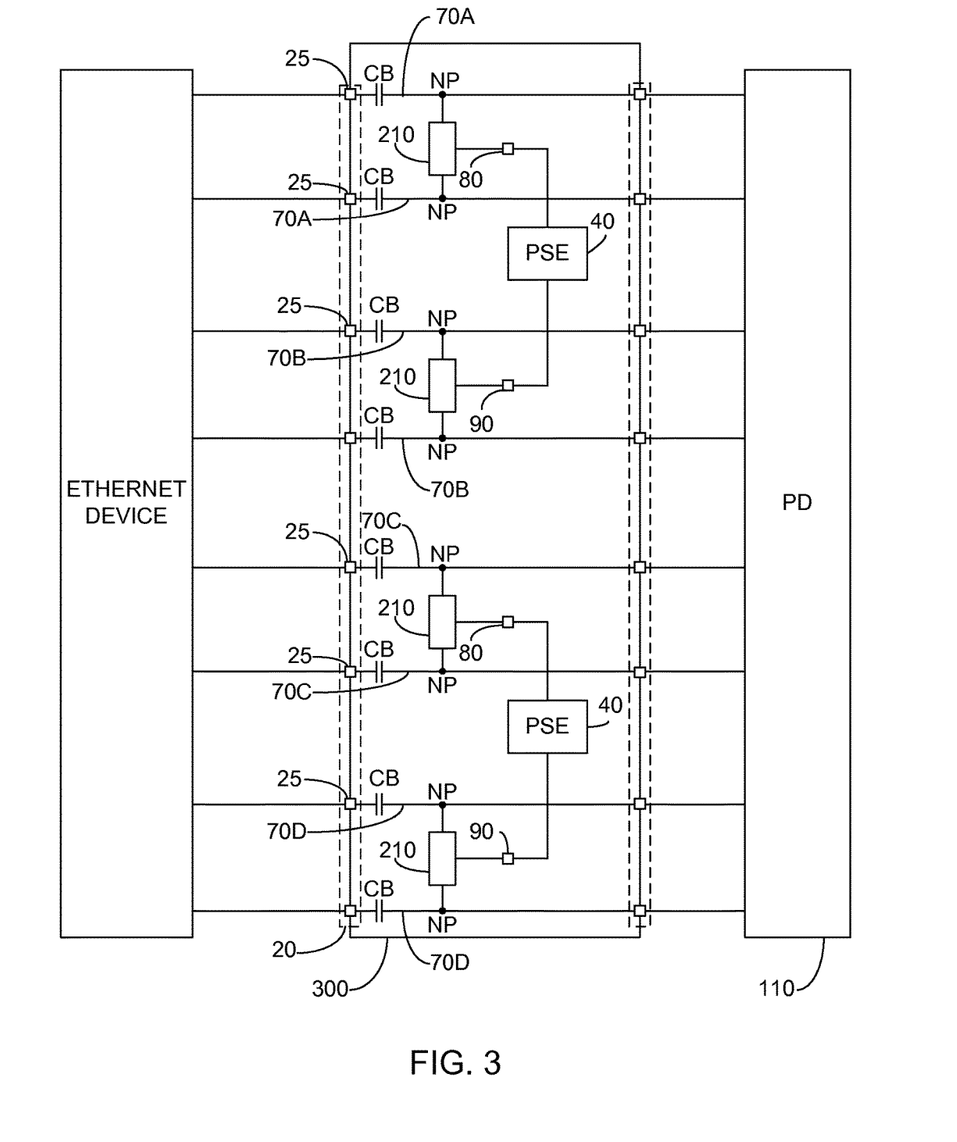
FIG. 3 illustrates a high level schematic diagram of a PoE midspan injector arranged to provide power to a powered device over 4 data wire pairs.

FIG. 3 illustrates a high level schematic diagram of a PoE midspan injector 300 arranged to provide power to a PD 110 over 4 data wire pairs 70A, 70B, 70C and 70D. PoE midspan injector 300 is in all respect similar to PoE midspan injector 200 of FIG. 2A, with the exception that an additional pair of power injectors 210 is provided for data wire pairs 70A and 70B, each coupled to a respective lead of a second PSE 40, as described above in relation to power injectors 210 coupled to data wire pairs 70C and 70D. In another embodiment (not shown), a single PSE 40 is provided for all 4 data wire pairs 70A, 70B, 70C and 70D. A blocking capacitor CB is further provided for each wire of data wire pairs 70A and 70B between the power node NP thereof and the associated pin 25 of Ethernet device side data port 20 Additionally, both PSEs 40 are provided within PoE midspan injector 300, the respective power reception ports 80 and power return ports 90 being electrical connections within PoE midspan injector 300. As described above, PSEs 40 can be provided external to PoE midspan injector 300, without exceeding the scope. The operation of PoE midspan injector 300 is in all respects similar to the operation of PoE midspan injector 200 with the exception that DC power is provided over all 4 data wire pairs 70A, 70B, 70C and 70D, and in the interest of brevity will not be further described.

Figure 4:
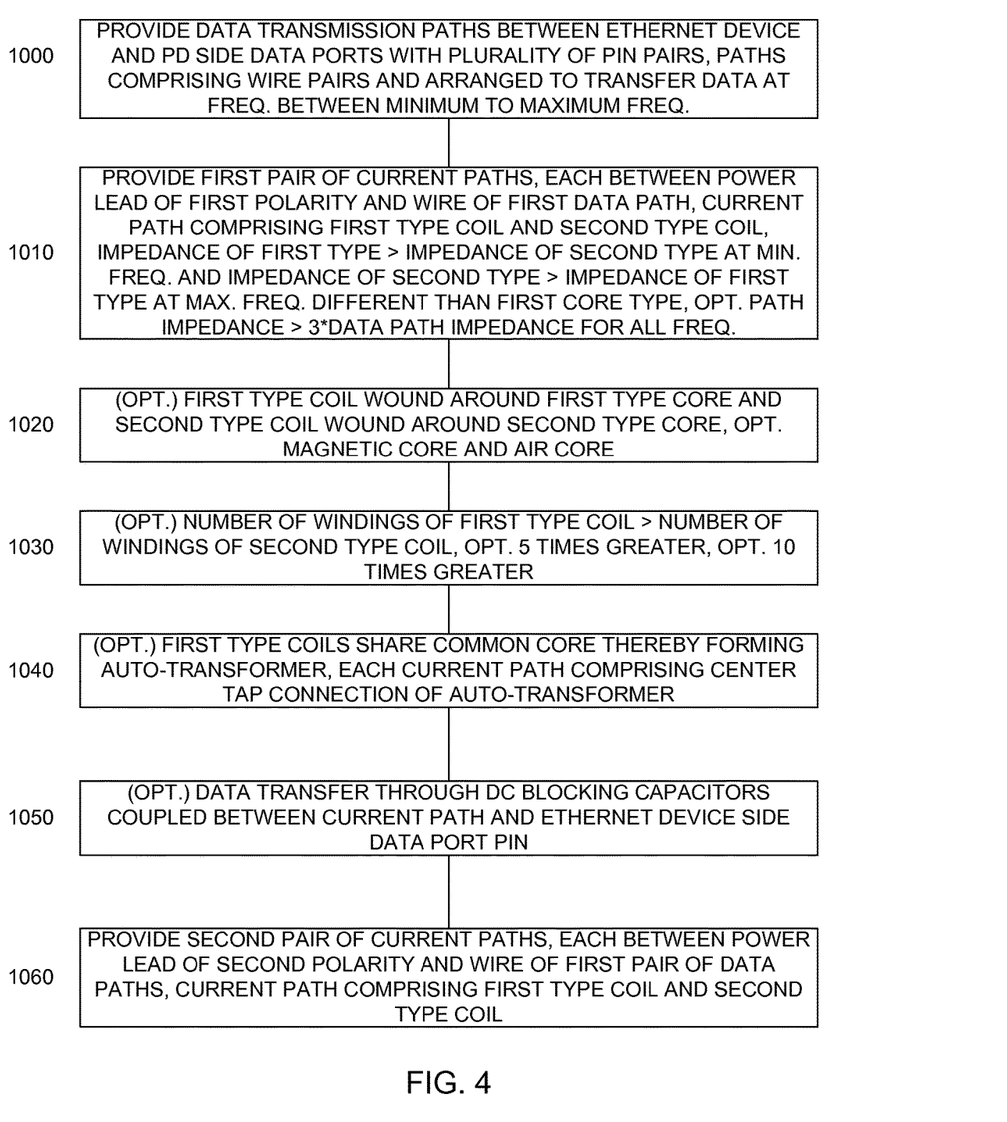
FIG. 4 illustrates a high level flow chart of a method of PoE midspan injection, according to certain embodiments.

FIG. 4 illustrates a high level flow chart of a method of PoE midspan injection, according to certain embodiments. In stage 1000, a plurality of data transmission paths between an Ethernet device side data port and a powered device side data port are provided, each data transmission path constituted of a pair of data wires. Each of an Ethernet device side data port and a powered device side data port comprise a plurality of pairs of pins, optionally 4 pairs of pins, each pair of pins associated with a particular one of the transmission paths. Each of the provided plurality of data transmissions paths comprises a respective one of a plurality of data wire pairs coupled between a respective one of the plurality of pairs of pins of the Ethernet device side data port and a respective one of the plurality of pairs of pins of the powered device side data port. Each of the plurality of data transmission paths is arranged to transmit data at frequencies of a range between a predetermined minimum frequency up to a predetermined maximum frequency In stage 1010, a first pair of current paths is provided, each between a first power lead, of a first polarity, and each wire of the wire pair of a first of the provided plurality of data transmission paths of stage 1000. Optionally, the first power lead is a power output of a PSE. Each of the provided first pair of current paths comprises a respective one of a first pair of first type coils and a respective one of a first pair of second type coils. The impedance of each first type coil is greater than the impedance of each second type coil at the minimum data frequency of stage 1000. As the data frequency increases, the impedance of each first type coil decreases until the impedance of each second type coil is greater than the impedance of each first type coil at the maximum data frequency. As described above, as the data frequency increases, the impedance of each second type coil decreases at a lesser rate than the impedance of each first type coil.

Optionally, each of the provided first current paths exhibits an impedance at least 2 times greater, and further optionally at least 10 times greater, than the differential impedance of the provided first data transmission path when data is being transmitted therethrough at any frequency between the minimum predetermined frequency up to the maximum predetermined frequency. Maintaining such an impedance ratio insures that the insertion and return losses are within 10G Ethernet specification parameters.

In optional stage 1020, the first type coil of stage 1010 is wound around a first type core and the second type coil of stage 1010 is wound around a second type core, different than the first type core. Optionally, the first core type is a magnetic core and the second core type is an air core. As described above, the term 'air core' as used herein is not limited to air and specifically includes any type of core which does not exhibit substantial magnetic permeability such as cores comprising ceramics, plastics or glass. Further optionally, as described above, the magnetic core comprises ferrite. As described above in relation to FIG. 2A, at high data frequencies, there is no roll off of the magnetic permeability of the air core. Additionally, as described above, the parasitic capacitance of the air core wound coil is less than the parasitic capacitance of the magnetic core wound coil.

In optional stage 1030, the number of windings of the first type coil of stage 1010 is greater than the number of windings of the second type coil of stage 1010. Optionally, the number of windings of the first type coil is at least 5 times greater, and further optionally at least 10 times greater, than the number of windings of the second type coil. As described above in relation to FIG. 2C, the reduced number of windings provides for a reduced parasitic capacitance. As a result, at high data frequencies, the impedance of the second type coil will be greater than the impedance of the first type coil.

In optional stage 1040, the first type coils share a common core thereby forming an auto-transformer, each of the first current paths of stage 1010 comprising a connection to the center tap of the auto-transformer. In particular, each first current path comprises: a respective half of the first type auto-transformer; and a respective second type coil. In one embodiment, the first type auto-transformer exhibits an inductance of 500 µH, optionally greater than 600 µH, the inductance measured at a frequency of about 100 kHz. In another embodiment, the second type coils of stage 1010 each exhibit an inductance of about 0.33 µH measured at a frequency of about 100 kHz.

In optional stage 1040, each of the data transmission paths of stage 1000 for which a current path of stage 1010 is provided, comprises a DC blocking capacitor coupled between the respective one of the provided first pair of current paths of stage 1010 and the respective pin of the Ethernet device side data port of stage 1000.

In optional stage 1050, a second pair of current paths is provided, each between a second power lead, of a second polarity, and a respective wire of a second pair of the provided plurality of data transmission paths of stage 1000. Each of the provided second pair of current paths comprises a respective one of a second pair of first type coils and a respective one of a second pair of second type coils. As described above in relation to stage 1010, in one embodiment the second power lead is coupled to a first end of each of the first type coils, each first type coil coupled to a respective data wire via a respective second type coil. In another embodiment, the second power lead is coupled to a first end of each of the second type coils, each second type coil coupled to the respective data wire via a respective first type coil. In one optional embodiment the first type coils of the second data path form an auto-transformer as described above in relation to stage 1020.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A power over Ethernet midspan injector for providing power to a powered device, the power over Ethernet midspan injector comprising:
    an Ethernet device side data port comprising a plurality of pairs of pins;
    a powered device side data port comprising a plurality of pairs of pins;
    a plurality of pairs of data wires arranged to transmit data at frequencies of between a predetermined minimum frequency up to a predetermined maximum frequency, each of said plurality of pairs of pins of said powered device side data port coupled via a respective one of said plurality of data wire pairs to a respective one of said plurality of pairs of pins of said Ethernet device side data port;
    a power reception port;
    a first pair of first type coils; and
    a first pair of second type coils, each of said first pair of second type coils coupled in series to a respective one of said first pair of first type coils thereby forming a first coil set,
    wherein said power reception port is coupled to each wire of the pair of data wire pairs at a respective power node, via a respective first coil set,
    wherein the impedance of said first type coil is greater than the impedance of said second type coil when data is being transmitted through said first data wire pair at said predetermined minimum frequency, and
    wherein the impedance of said second type coil is greater than the impedance of said first type coil when data is being transmitted through said first data wire pair at said predetermined maximum frequency.

2. The injector of claim 1, wherein the impedance of each of said first coil sets is at least 2 times greater than the differential impedance of said first data wire pair when data is being transmitted through said first data wire pair at any data frequency between said predetermined minimum frequency and said predetermined maximum frequency.

3. The injector of claim 1, wherein each of said first pair of first type coils is wound around a first type core and each of said first pair of second type coils is wound around a second type core.

4. The injector of claim 3, wherein said first type core is a magnetic core and said second type core is an air core.

5. The injector of claim 1, wherein the number of windings of each of said first pair of first type coils is greater than the number of windings of each of said first pair of second type coils.

6. The injector of claim 5, wherein the number of windings of each of said first pair of first type coils is at least 5 times greater than the number of windings of each of said first pair of second type coils.

7. The injector of claim 1, wherein said first pair of first type coils share a common core thereby forming a first auto-transformer, said power reception port coupled to a center tap of said first auto-transformer.

8. The injector of claim 1, further comprising a plurality of direct current (DC) blocking capacitors, said first data wire pair arranged to couple said respective pin pair of said device side data port with said respective pin pair of said switch side data port via a respective pair of said plurality DC blocking capacitors, each of said respective DC blocking capacitors coupled between said respective power node of said respective data wire and said respective pin of said Ethernet device side data port.

9. The injector of claim 1, further comprising:
a power return port;
a second pair of first type coils; and
a second pair of second type coils, each of said second pair of second type coils coupled in series to a respective one of said second pair of first type coils thereby forming a second coil set,
wherein said power return port is coupled to each wire of a second pair of said plurality of data wire pairs at a respective power node, via a respective second coil set.

10. The injector of claim 9, wherein said second pair of first type coils share a common core thereby forming a second auto-transformer, said power reception port coupled to a center tap of said second auto-transformer.

11. The injector of claim 9, further comprising a power sourcing equipment, a power output of said power sourcing equipment coupled to said power reception port and a return of said power sourcing equipment coupled to said power return port.

12. A Power over Ethernet midspan injection method comprising:
providing a plurality of data transmission paths between an Ethernet device side data port and a powered device side data port, each of the Ethernet device side data port and the powered device side data port comprising a plurality of pairs of pins, each of said provided plurality of data transmissions paths comprising a respective one of a plurality of data wire pairs coupled between a respective one of the plurality of pairs of pins of the Ethernet device side data port and a respective one of the plurality of pairs of pins of the powered device side data port, each of said plurality of data transmission paths arranged to transmit data at frequencies of between a predetermined minimum frequency up to a predetermined maximum frequency; and
providing a first pair of current paths, each between a first power lead, of a first polarity, and the data wire pair of a first of said provided plurality of data transmission paths, each of said provided first pair of current paths comprising a respective one of a first pair of first type coils and a respective one of a first pair of second type coils,
wherein the impedance of the first type coil is greater than the impedance of the second type coil when data is being transmitted through said first data wire pair at said predetermined minimum frequency, and
wherein the impedance of the second type coil is greater than the impedance of the first type coil when data is being transmitted through the first data wire pair at said predetermined maximum frequency.

13. The method of claim 12, wherein the impedance of each of the first coil sets is at least 2 times greater than the differential impedance of the first data wire pair when data is being transmitted through the first data wire pair at any data frequency between said predetermined minimum frequency and said predetermined maximum frequency.

14. The method of claim 12, wherein each of the first pair of first type coils is wound around a first type core and each of the first pair of second type coils is wound around a second type core.

15. The method of claim 14, wherein the first type core is a magnetic core and the second type core is an air core.

16. The method of claim 12, wherein the number of windings of each of the first type coils is greater than the number of windings of each of the second type coils.

17. The method of claim 12, wherein the number of windings of each of the first type coils is at least 5 times greater than the number of windings of each of the second type coils.

18. The method of claim 12, wherein the first core type coils of the first pare share a common core thereby forming an auto-transformer, each of said provided first current paths comprising a center tap connection of the auto-transformer.

19. The method of claim 12, further comprising providing a second pair of current paths, each between a second power lead, of a second polarity, and the data wire pair of a second of said provided plurality of data transmission paths, each of said provided second pair of current paths comprising a respective one of a second pair of first type coils and a respective one of a second pair of second type coils.

20. A power over Ethernet system comprising:
an Ethernet device; and
a midspan injector arranged to provide power for a powered device,
wherein said midspan injector comprises:
an Ethernet device side data port comprising a plurality of pairs of pins and in communication with said Ethernet device;
a powered device side data port comprising a plurality of pairs of pins and arranged to be in communication with a powered device;
a plurality of pairs of midspan data wires arranged to transmit data at frequencies of between a predetermined minimum frequency up to a predetermined maximum frequency, each of said plurality of pairs of pins of said powered device side data port coupled via a respective one of said plurality of midspan data wire pairs to a respective one of said plurality of pairs of pins of said Ethernet device side data port;
a power reception port;
a first pair of first type coils; and
a first pair of second type coils, each of said first pair of second type coils coupled in series to a respective one of said first pair of first type coils thereby forming a first coil set, wherein said first power reception port is coupled to each wire of a first pair of said plurality of midspan data wire pairs at a respective power node, via a respective first coil set, wherein the impedance of said first type coil is greater than the impedance of said second type coil when data is being transmitted through said first data wire pair at said predetermined minimum frequency, and wherein the impedance of said second type coil is greater than the impedance of said first type coil when data is being transmitted through said first data wire pair at said predetermined maximum frequency.

21. The system of claim 20, wherein the impedance of each of said first coil sets is at least 2 times greater than the differential impedance of said first data wire pair when data is being transmitted through said first data wire pair at any data frequency between said predetermined minimum frequency and said predetermined maximum frequency.

22. The system of claim 20, wherein each of said first pair of first type coils is wound around a first type core and each of said first pair of second type coils is wound around a second type core.

23. The system of claim 22, wherein said first type core is a magnetic core and said second type core is an air core.

24. The system of claim 20, wherein the number of windings of each of said first pair of first type coils is greater than the number of windings of each of said first pair of second type coils.

25. The system of claim 24, wherein the number of windings of each of said first pair of first type coils is at least 5 times greater than the number of windings of each of said first pair of second type coils.

26. The system of claim 20, wherein said midspan injector further comprises:
    a power return port;
    a second pair of first type coils; and
    a second pair of second type coils, each of said second pair of second type coils coupled in series to a respective one of said second pair of first type coils thereby forming a second coil set,
    wherein said power return port is coupled to each wire of a second pair of said plurality of data wire pairs at a respective power node, via a respective second coil set.

* * * * *